United States Patent
Jonsson

(10) Patent No.: US 6,574,467 B1
(45) Date of Patent: Jun. 3, 2003

(54) METHOD AND APPARATUS OF INVOKING SERVICES IN A TELECOMMUNICATIONS TERMINAL

(75) Inventor: Björn Jonsson, Järfälla (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/556,872

(22) Filed: Apr. 21, 2000

(30) Foreign Application Priority Data

Apr. 23, 1999 (SE) .......................................... 9901505-9

(51) Int. Cl.<sup>7</sup> ................................................. H04Q 7/20
(52) U.S. Cl. ...................... 455/414; 455/406; 455/558
(58) Field of Search ............................... 455/406, 414, 455/415, 432, 435, 558

(56) References Cited

U.S. PATENT DOCUMENTS

| | | | | |
|---|---|---|---|---|
| 5,657,375 A | * | 8/1997 | Connolly et al. | ............ 455/436 |
| 5,764,730 A | | 6/1998 | Rabe et al. | .................... 379/58 |
| 5,930,700 A | * | 7/1999 | Pepper et al. | .......... 379/211.02 |
| 5,933,785 A | * | 8/1999 | Tayloe | ........................ 455/435 |
| 5,974,308 A | * | 10/1999 | Vedel | ........................ 379/130 |
| 6,115,601 A | * | 9/2000 | Ferreira | .................... 379/114.2 |
| 6,198,915 B1 | * | 3/2001 | McGregor et al. | .......... 455/406 |
| 6,347,224 B1 | * | 2/2002 | Smyth et al. | .......... 379/112.01 |
| 6,400,946 B1 | * | 6/2002 | Vazvan et al. | ............... 455/432 |

FOREIGN PATENT DOCUMENTS

| | | |
|---|---|---|
| EP | 0 526 981 | 2/1993 |
| WO | 98/38820 | 9/1998 |
| WO | 98/53629 | 11/1998 |

* cited by examiner

Primary Examiner—Thanh Cong Le
Assistant Examiner—Tan Trinh
(74) Attorney, Agent, or Firm—Burns, Doane, Swecker & Mathis, L.L.P.

(57) ABSTRACT

The invention is concerned with a method in a telecommunications terminal, e.g. a mobile phone, comprising an identification module with several subscriber numbers, of invoking desired services provided by different service providers. In the method a category of an incoming or outgoing call can be determined. A desired service is selected, in accordance with the category determined, among the services provided by a service provider associated with the mobile phone through service access numbers stored in the module. There is called to a service access number of the service provider providing a desired service in accordance with a certain call handling function by means of which the desired service can be invoked and charged in different ways, whereafter the service provided by the service provider is invoked. The invention is also concerned with a telecommunications terminal and the use of the terminal in different roles, such as a private person, an employee and as a member in different organizations.

49 Claims, 3 Drawing Sheets

| Subscriber no.1 |
|---|
| Subscriber no.2 |
| Subscriber no.3 |
| Subscriber no.4 |

| Service provider no.1 | Golf Club |
|---|---|
| Service provider no.2 | Employer |
| Service provider no.3 | Bank |
| SIM-card operator | Private |

FIG. 1

METHOD AND APPARATUS OF INVOKING SERVICES IN A TELECOMMUNICATIONS TERMINAL

TECHNICAL FIELD

The invention is concerned with a method, in a telecommunications terminal having an identification module with several subscriber numbers, of invoking desired services in a desired way and a telecommunications terminal with several subscriber numbers as well as the use of such a terminal. The telecommunications terminal may e.g. be a mobile phone used in a network system, such as GSM, D-AMPS etc. The invention is also concerned with the use of the terminal.

DESCRIPTION OF BACKGROUND ART

Mobile phones are part of telecommunications networks comprising base stations, mobile terminals and links between them in form of radio carriers. A company administrating a telecommunications network is called an operator. The operators offer carrier services and tele services for the clients and users. The carrier service is the transport system and the tele service comprises functions for connection of the terminals and forming of information. By means of the most common basic teleservice, two users can communicate with each other by means of terminals connected to each other via the telecommunications network.

The tele services can in addition to the basic service (e.g. a speech communication between two users) be value-added services (like information data bases, telephone number information services) or distributed additional services as wake up services etc. or IN-services. IN-services are based on the fact that a network has a central intelligence that makes a flexible handling of debiting possible, credit card calls being an example. The centralization of the additional services in special nodes in a network is made by a technique named IN (intelligent networks or network intelligence).

Different groups of interest can be identified in the handling and the using of services. In addition to the network operators, we may have independent service providers, which by using the networks operated by the network operators offer interesting services to the end users. These services can be implemented by independent service providers by adding service nodes at the periphery of the network. The services are paid by the subscribers who are using them or by organizations to which they belong. The networks and the nodes of the operators' networks are used to distribute the services and the gain is shared by operator and service provider.

The drawbacks of the IN-technique are that the services are tied to the networks providing the network intelligence. This leads to problems when users use different networks offering different services. Also if a user switches from one network to another the services that are available may change.

A service node has functions to handle incoming calls with different call handling functions. The call handling functions are used to make calls charged to the service providers.

Universal personal telecommunications (UPT) means that a directory number is not coupled to a given terminal but to a certain person. UPT is akind of service implemented by traditional network intelligence. It is a future object to have a personal number to all services. In UPT the basic functions has to do with incoming and outgoing calls and the call handling functions in connection with those.

Mobile phones today may be given different numbers that may e.g. be used to differentiate between private and professional use. There often exists the option to pay for privet use privately and for professional use by the employer. It is therefore common that operators offer a user the possibility to have two numbers associated with the terminal in order to distinguish between private calls and other calls. Other calls than private are then paid by a corresponding organization, e.g. an employer. The operator keeps separate billing records for different categories of calls.

The network subscription of the mobile phone is defined by a s.c. Subscriber Identity Module, also called SIM card. If a mobile phone has two or more subscriber numbers, they are conventionally defined by the same SIM card and thus tied to one operator.

Usually, a subscription with a mobile telephone operator gives the user access to certain services provided and charged by the operator. The subscription, defined by a SIM card in the mobile terminal, is associated with a set of services managed and charged by the operator. However, the user is usually limited in the choice and kind of services to what the selected operator offers. In conventional mobile phones it is not usually possible to choose e.g. a private service with a service provider that is not the same as the service provider associated with the operator providing the SIM-card, obtained from e.g. the employer, without a need for separate phones.

A multinumber SIM card is known from U.S. Pat. No. 0,859,194 which is presented as prior art. The SIM card contains a first identification number and a second identification number. The numbers allow the phone to respond to incoming calls for the different telephone numbers at any specific time.

SUMMARY OF THE INVENTION

One object of the invention is to support a user to use a single terminal in different roles, i.e. as a private person, an employee, a member in an organization etc.

Another object of the invention is to make it possible for a user to see in which of these roles an incoming call has been made.

A further object of the invention is to make different services available to support these roles.

Thus, there is a need for more practical solutions to make it possible to choose among different service providers, thereby extending the possibilities for different services, increasing the possibilities of invoking different services and the ways of charging the services used in the desired way.

Still one object of the invention is to provide a possibility while having one subscription with one network operator to select among several separate services, e.g. associated with membership in various associations, by the same mobile phone so that the one or more of the above requirements are fulfilled.

A further object of the invention is to provide a possibility to connect desired services during an ongoing call.

Still one object of the invention is to provide a possibility, wherein the call in connection with the service selected can be registered to be paid as wished either by the user of the phone, the caller or a preferred service provider.

The method of the invention is used in a telecommunications terminal, comprising an identification module with several subscriber numbers, for invoking desired services provided by different service providers. The invention is especially advantageous in connection with mobile phones but is equally useful in other kinds of radio terminals.

The method of the invention is mainly characterized by determining a category for an incoming or outgoing call, and in accordance with the category determined, selecting a desired service among the services provided by a service provider associated with the terminal through service access numbers stored in the identification module. A service access number of a service provider providing a desired service is then used in accordance with a certain call handling function by means of which the desired service can be invoked and charged in different ways, whereafter the service provided by the service provider is invoked.

There can be a number of different such services supporting different user roles.

The category of the call can be determined by means of associations defined between at least one of the subscriber numbers in the module with at least one service provider providing one or more of different services. Each of the subscriber numbers of the mobile phone may be associated with different service access numbers of different service providers. It may also be possible for the user to explicitly order a specific service.

In accordance with the first and second call categories, the desired service is selected by the user alternatively, on the basis of the called or calling subscriber number of an incoming call. In these cases the desired service can be selected in advance by storing the called or calling number of the incoming call and by invoking the right service access number during an ongoing communication. The desired service can also be selected by the user in accordance with a third category by means of the mobile phone by both selecting and invoking the right service access number during an ongoing communication. In accordance with a fourth category, the service is selected in advance among the services available through service access numbers stored in the terminal.

Another aspect of the invention is mainly characterized by defining associations between at least one of the subscriber numbers in the identification module with at least one service provider providing one or more of different services. A desired service is selected among the services provided by a service provider associated with the terminal through service access numbers stored in the terminal. A service access number of the service provider providing a desired service is called to in accordance with a certain call handling function by means of which the desired service can be invoked and charged in different ways, and the service provided by the service provider is invoked.

Associations between at least one of the subscriber numbers in the identification module can be defined with at least one service provider providing one or more of different services by storing the associations in the terminal permanently so that s service provider is associated with the terminal through service access numbers.

Preferably, each of the subscriber numbers of the telecommunications terminal is associated with different service access numbers of different service providers.

The telecommunications terminal is for example a mobile phone and in that case the identification module is a SIM card.

The method of the invention is preferably used in a mobile phone having associations in the SIM card between one or more subscriber numbers and one or more service access numbers. This gives the possibility for a user to define a call category and depending on the call category, act in different roles, such as private, business, membership in an organization etc. by using a subscriber number associated with the role in question.

The service providers associated with the subscriber numbers in the invention might provide desired services not provided by the network operator and thus more services are available for the user.

In a preferred embodiment, each subscriber number of the telecommunications terminal is associated with different service access numbers of different service providers.

The terminal of the invention has functions in form of data records for creation of associations between subscriber numbers, stored in the identification module with specific service providers having service nodes identified by service access numbers. The selection of the service access number can be carried out by means of a list stored in the terminal. If the module is of the prepaid subscription type, one subscriber number can even be associated with a prepaid service, provided by the network operator.

The services associated with the different service access numbers to certain service nodes can be formed in many ways. When a service node has received a request for a service, it might automatically start the service in accordance with predefined rules, as for example provide predefined information, establish data connections etc. Alternatively, a service can be requested during the connection to the service node. Services may involve use of bearer services other than circuit switched connections e.g. packet data transport using GPRS.

By means of the call handling functions it is possible to choose the payer of the calls and the ways of service connection in a desired way when selecting the desired service. In this way the calls needed when using a service may be charged via the service provider imposing no call charges on the network subscription.

The payer of the call can be registered by means of a certain call handling function. The call handling functions used to make calls charged to the service provider is based on use of networks applying "calling party pays" charging.

The terminal of the invention comprising an identification module with several subscriber numbers, is mainly characterized in that it has functions allowing a user to define an association between one of a plurality of subscriber numbers, stored in the module, with a specific service provider providing different services through service access numbers stored in the module so that by calling to a service access number to a desired service in accordance with a certain call handling function, the desired service can be invoked and charged in different ways.

The call handling function can be determined by a call category defined for each subscriber number of the terminal by means of which the call also can be charged in the desired way. The different call categories can be associated with the different subscriber numbers used to call the terminal and to different service access numbers used to invoke different services.

At least one of a plurality of subscriber numbers belonging to said terminal is associated in form of data records with a service access number identifying a service node.

In accordance with some of the call handling functions, incoming calls are paid by the caller and outgoing calls by the user of the terminal. This invention also offers the possibility for call handling functions, wherein the incoming call to a subscriber number or an outgoing call to a service access number is registered to be paid by the service provider of the service associated with the subscriber number or the service access number called. As a third possibility, the incoming calls can be charged on an other organization, such as the employer.

The calls can thus be classified in categories in accordance with the payer of the call. One category of outgoing calls can for example be paid via a card. Other categories can be paid via the respective service provider. In the invention, any subscriber number identified by the module can be associated with a call category, which are then handled by different call handling functions.

In accordance with one of the call handling functions, incoming calls to some of the subscriber numbers associated with the terminal registered to be paid by the caller by using a direct method of calling.

In accordance with another call handling function, incoming calls to some of the subscriber numbers associated with the terminal are registered to be paid by the provider of the service associated with the subscriber number, or by an organization, using an indirect method of calling. However, if an organization does not want to pay for delivering incoming calls to the mobile phone, a direct method connecting directly to a service-phone is required. In that case it is possible to inform a calling user, e.g. by a voice message, and advise to make a direct call to one of the numbers associated with the phone. The organization may also handle incoming calls via an office extension number but conditionally forward the call or advise the caller to make a direct call. The choice may be made by a human (e.g. an operator) or automated by software applying a service policy.

In accordance with a further call handling function, outgoing calls are registered to be paid by the user of the terminal by using a direct method of calling out.

In accordance with still one call handling function, outgoing calls to a certain service number are registered to be paid by the service provider or an organization by using an indirect calling method.

Indirect outgoing calls to a service number or to certain other subscriber numbers can be charged on the service provider or an organization by for example using the a previously known call back procedure described in U.S. application Ser. No. 09/170830 called "Telecommunications Network and Method for Establishing a Form of meeting between parties" which is referred to as a reference herein. By this method debiting the user subscriber is avoided. The service provider can then charge the user according to own routines. In the callback procedure, the initial call is interrupted before the establishment of a traffic channel, thus not incurring any costs to the calling subscriber. The user will thereafter have access to the services provided by the service node, e.g. to make an outgoing call.

When a desired service is selected during an ongoing call, the terminal in accordance with one possibility stores the calling number, which then can be used to invoke the desired service, if needed, during a communication. This might be the case, when a direct call already has been established by an incoming or outgoing direct call, in which case the services of a service node may afterwards be invoked. For this purpose, the ongoing call has to be split into two parts both connected to an intermediary service node. The detailed steps for inserting a service node into a circuit that is already established differs slightly depending on the case, i.e. if it for example is question about an incoming direct call or an outgoing call.

Incoming direct calls are made to any number associated with the identification module. Desired services are selected by calling to a service access number associated with the preferred service.

Incoming indirect calls are made to a service node or the like associated with an organization. The caller is first calling to a service node and the service node, wherein the number to be used is decided, then delivers to the terminal by calling one of the numbers belonging to the module and which is associated with the intermediary system. Calls that are forwarded by the intermediary system (the service node) can be charged by the organization providing the service and do not invoke charges on the module. In this case the original caller pays the same for a call to the organization irrespective of whether the called party is reached at the office or via the mobile network.

In accordance with a certain call handling function, the desired service is invoked during an ongoing communication between the terminal and another subscriber via an intermediate service node offering the service. In such an alternative, the ongoing connection is parked by one of the participants of the ongoing communication, and a service access number to a service node offering the desired service is then selected and a first call to the service node is made. The original, parked connection is then returned to so that a call back from the service node could be answered. Said service node rejects the initial first calls and makes a second call back to the initiating subscriber having called to the service node. Said second call is answered and a connection between the participants of the ongoing communication and the service node is requested. Said service node then provides services to the terminal and the other subscriber. This embodiment of the invention can for example be used in connection with a service wherein, information is wished to be delivered to both parties of the call.

In a preferred embodiment the connection requested is a conference connection between the participants of said ongoing communication and said service node, whereby the method is further characterized by that said service node makes a third call to the initiating subscriber. Said conference call is parked and said third call answered. Said service node then provides separate connections to the subscribers, i.e. the terminal respective the other subscriber, thereby providing services separately. With this embodiment it is possible, during an ongoing call, to deliver information only to one of the parties of the call or for the service node to interact independently and differently with the parties of the call.

All the steps done by other than the service node is carried out by the requesting party, who initiated the actions. These steps are preferably done automatically by the terminal.

When no longer needed, the service node is disconnected upon request by the terminal that initiated the service. The conference is then terminated whereby both parties are returned to the original call and the service node disconnected.

The payer of a service can be registered by means of the fact that the service node has separate connections to the subscribers, whereby the original connection is registered to be paid by the caller and the calls from the service node to the requesting subscriber are paid by the service provider, which in turn has own system of charging its clients.

Examples of some call handling functions of current circuit switched networks are presented in accordance with the invention by means of the following figures that are not meant to restrict the invention anyway, because the details of the invention can vary within the scope of the claims.

The terminal and method of the invention have several advantages. The user may use one personal phone connected to one mobile network for separate subscriptions with different service providers for private calls, work calls and other categories of calls. The private subscription can provide private services according to private preferences. Other subscriptions may offer different services provided by different service providers. Corporate services may be identical when users use in-house phones or mobile phones. The mobile network operator does not have to handle invoicing and credit risks for individual private users because the different service providers can do this. This is very cost efficient. Corporate customers and other service providers can be charged on volume price agreements making individual charging by the network operator unnecessary.

In addition to the advantages of the invention already mentioned as the services can be provided via a corporate service node and not by the mobile network that is used, it is possible for an employer to provide exactly the same services independent of whether the called party is reached via an in-house network or a mobile network. The same corporate extension numbers can be used to receive calls for the employers via in-house networks. The network subscription may also be changed to another operator without affecting the user services.

With packet based networks used e.g. for voice over IP, circuit switched calls corresponds to virtual circuits. Several logical circuits between nodes and terminals may then exist in parallel and several connections and the associated signaling can proceed in parallel. Thus, for example parking a call while answering another is not necessarily performed exactly in the way described here, however, actions as creating conferences and switching parties on and off as necessary with the method can still be supported. The details of the invention can thus vary within the scope of the claims.

BRIEF DESCRIPTION OF THE DRAWINGS

FIG. 1 presents an example of the associations between subscriber numbers and connection data in a SIM card to be used in the invention

DETAILED DESCRIPTION OF THE DRAWINGS

Figure 2:
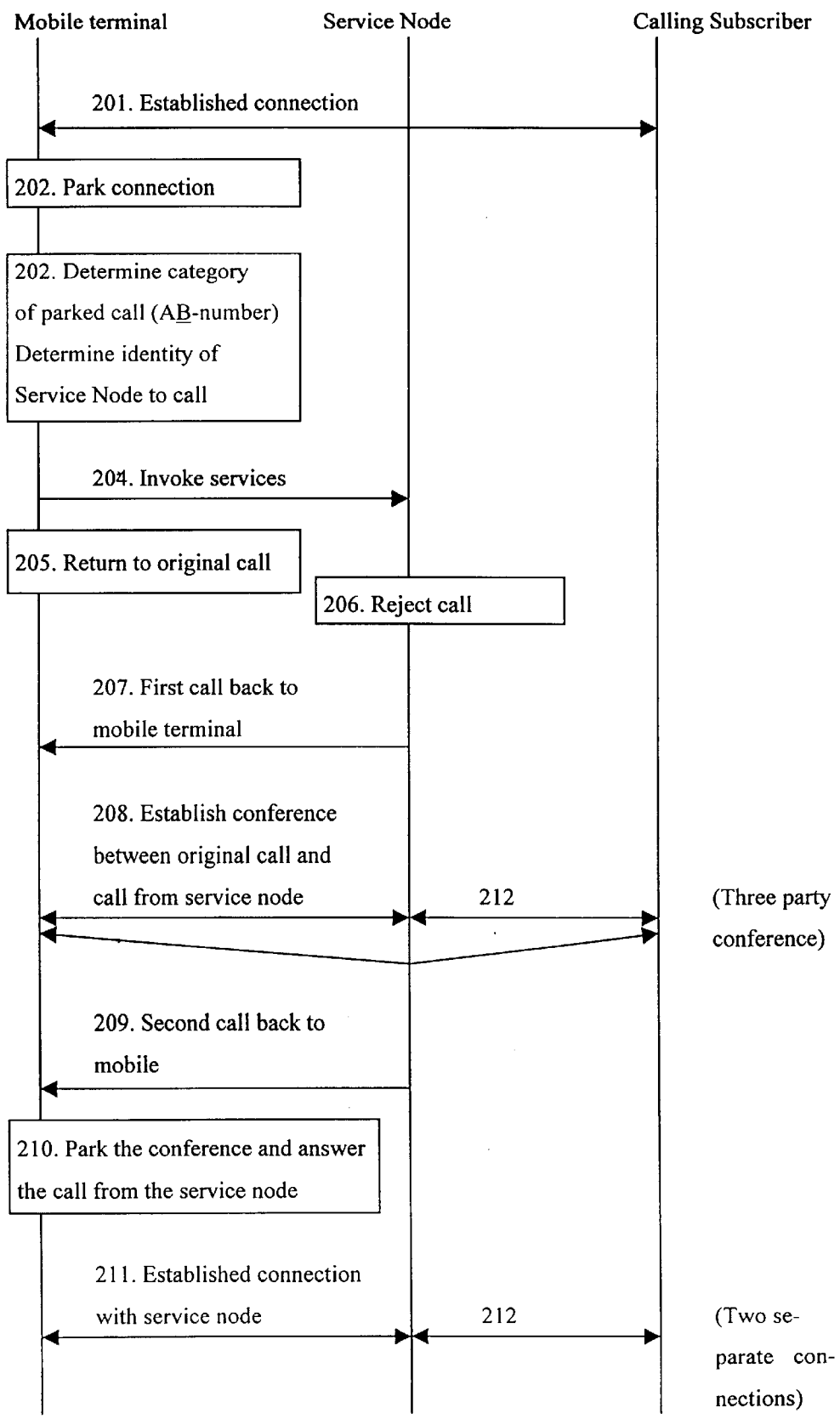
FIG. 2 is a diagram of an embodiment of the method of the invention, wherein a service is invoked during an ongoing call in case of an incoming call.

The mobile terminal according to the invention has functions allowing a user to define an association between one of the subscriber numbers stored in the SIM card, with a specific service provider. FIG. 1 shows exemplary data records for the creation of such associations.

Subscriber number 1 is in accordance with FIG. 1 associated with service provider 1 which is a golf club. Subscriber number 2 is associated with service provider 2 which is the employer. Subscriber number 3 is associated with service provider 3 which is the bank. Subscriber number 3 is associated with the SIM card operator for the purpose of private calls. The subscriber numbers may be associated with different call categories in connection to the service associated with the service provider. Different call categories are discussed in the following chapter. The service providers provide certain services. The bank might for example provide data of the bank account of the user, and other relevant data as well ass payment services etc. the golf club might provide information of competition results and receive orders from the user etc.

In FIG. 2 a service is invoked during an ongoing call. The ongoing call 201 is an established connection between the mobile terminal and a calling subscriber. The call of FIG. 2 is presumed to be an incoming call to the mobile phone. When the incoming call was received, the mobile phone stored the calling number to the subscriber number of the mobile phone and registered the call category indicated by the called number in accordance with which the call should be charged. The ongoing call is parked at 202 by the party requesting the service, in this case by the mobile phone. A second call is made, at 204, to invoke the services of a service node. The service node to be called is chosen at 203. The service access number to be called is chosen by the user or determined by the phone e.g. by use of the stored call category and of the list shown in FIG. 1. The service node rejects at 206 the call but identifies the caller by calling number identification. The mobile returns, at 205, to the original call prepared to answer a second call. The service node calls the mobile at 207. The mobile knows, by calling number identification, that this is the return call from the service node. The mobile answers the call from the service node and initiates, at 208, a conference with the two callers. The service node makes a second call, at 209, to the mobile. The mobile parks the conference and answers the second call.

After this procedure, the service node has separate connections, 211 and 212, to the mobile and the original caller, respectively. The original caller pays for the original call and the service provider for the calls to the mobile. The service node may now interact with the two parties individually and e.g. connect auxiliary equipment between them when needed, and provide the services that are requested.

When there are no longer any need for having the service node connected, the mobile requests the service node to disconnect from the conference which was established in step 208, and thereby returns to the original call only comprising the original calling subscriber. The caller and the mobile are then again directly connected.

Figure 3:
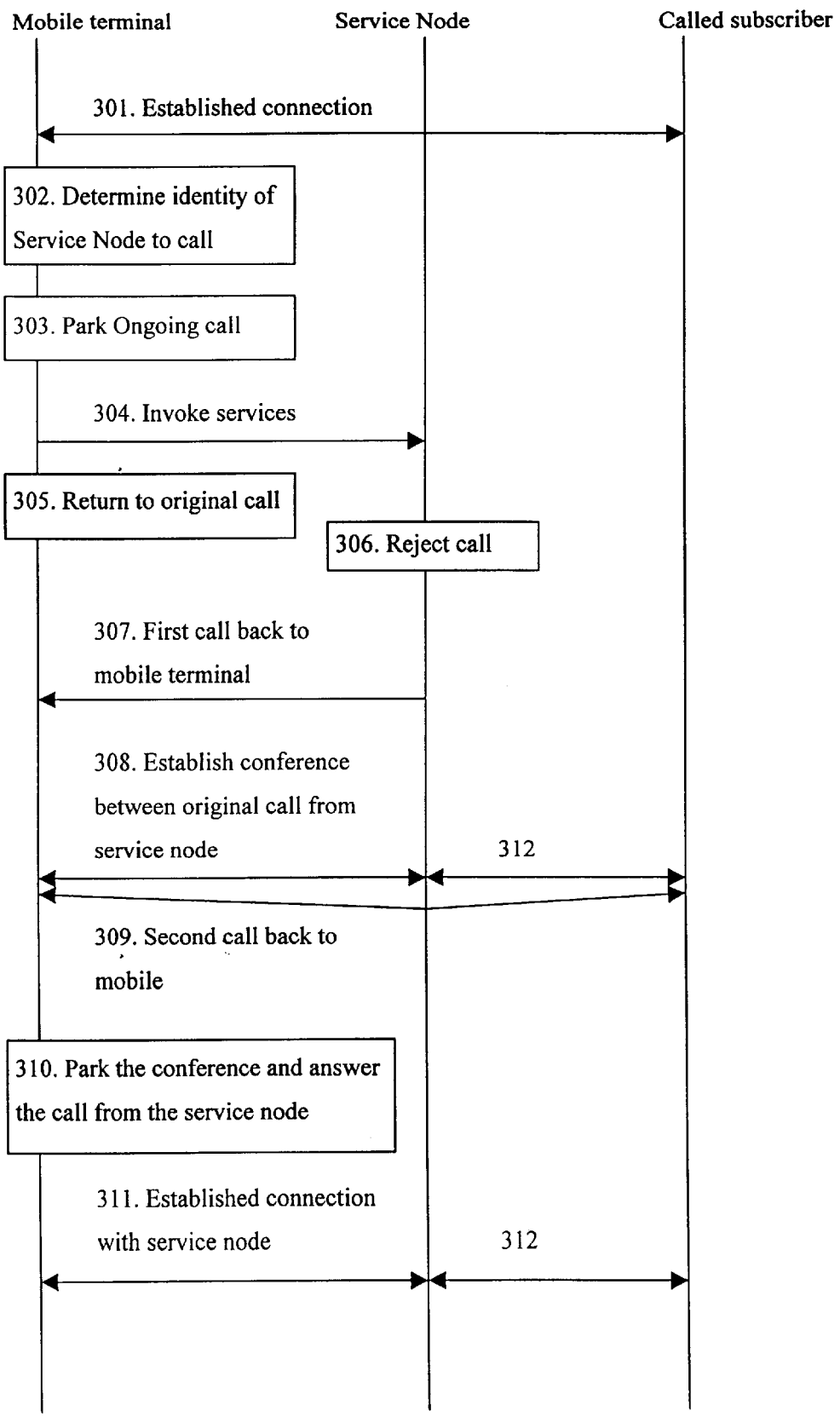
FIG. 3 is a diagram of an embodiment of the method of the invention, wherein a service is invoked during an ongoing call in case of an outgoing call.

FIG. 3 illustrates the case of an ongoing call originally established by an outgoing call made by the mobile phone. At 301 there is shown an established connection in speech mode between a mobile terminal and a called subscriber. At 302, the mobile subscriber decides to request support from a service node and determines which service node to address. The service node that is chosen may depend on the category of the ongoing call. The data records described in FIG. 1 may include at least one predefined data entry about the category of the call and the identity of a corresponding service node. For example, the called user may be a member of the same golf club as the calling mobile user and, if the communication concerns matters related to this common interest, it would be adequate to insert a service node of the golf club into the communication path. At 303, the mobile terminal parks the ongoing connection and, at 304, makes a call to the selected service node. The remaining steps 305–311 correspond to the steps 205–212 in FIG. 2.

What is claimed is:

1. Method in a telecommunications terminal, comprising an identification module with several subscriber numbers, of invoking desired services provided by different service providers, characterized by the following steps determining a category for an incoming or outgoing call, selecting a desired service, in accordance with the category determined, among the services provided by service providers associated with the terminal through service access numbers stored in the identification module, calling to a service access number of the service provider providing a desired service in accordance with a certain call handling function by means of which the desired service can be invoked and charged in different ways, invoking the service thereby provided by the service provider.

2. Method of claim 1, characterized in that the category of the call is determined by means of associations defined between at least one of the subscriber numbers in the identification module with at least one service provider providing one or more of different services.

3. Method of claim 2, characterized in that at least one subscriber number is associated with a prepaid card permitting calls from the number to be charged on the identification module.

4. Method of claim 1, characterized in that in accordance with one of the call categories, the desired service is selected by the user on the basis of the called subscriber number of an incoming call.

5. Method of claim 1, characterized in that in accordance with one of the call categories, the desired service is selected by the user on the basis of the calling number of an incoming call.

6. Method of claim 1, characterized in that in accordance with one of the call categories, the desired service is selected by the user during the ongoing call.

7. Method of claim 1, characterized in that in accordance with one of the call categories, the desired service is selected by the user in advance among the services provided by a service provider associated with the terminal.

8. Method of any of claim 7, characterized in that the each of the subscriber numbers of the telecommunications terminal is associated with different service access numbers of different service providers.

9. Method of claim 1, characterized in that the telecommunications terminal is a mobile phone.

10. Method of claim 9, characterized in that the identification module is a SIM card.

11. Method of claim 1, characterized in that the desired service is selected by the user by means of the terminal in advance by storing the called or calling number of the incoming call and by invoking the right service access number during an ongoing communication.

12. Method of claim 1, characterized in that the desired service is selected by the user by means of the terminal by selecting and invoking the right service access number during an ongoing communication.

13. Method of claim 1, characterized in that the selection of the service access number is carried out by the user by means of the terminal by using a list stored in the mobile terminal.

14. Method of claim 1, characterized in that that the desired service is selected by the user by means of terminal in advance among the services available through service access numbers stored in the mobile phone.

15. Method of claim 1, characterized in that the call handling function can be determined by a call category defined for each subscriber number of the terminal by means of which the call also can be charged in the desired way.

16. Method of claim 1, characterized in that, in accordance with a certain call handling function, the desired service is invoked during an ongoing communication between the terminal and another subscriber via an intermediate service node offering the service.

17. Method of claim 16, characterized by the following steps a)–h), steps a)–d) and f)–g) being carried out by the same subscriber of the ongoing communication,
  a) parking the ongoing connection by one of the subscribers of the ongoing communication,
  b) selecting a service access number to a service node offering the desired service,
  c) making a first call to the service node selected,
  d) returning to the original, parked connection, so that a call back from the service node could be answered,
  e) said service node rejecting the call and making a second call back to the subscriber having called to the service node,
  f) answering said second call,
  g) requesting a connection between the participants of the ongoing communication and the service node,
  h) said service node providing services to the terminal and the other subscriber.

18. Method of claim 17, characterized in that the connection requested in step
  g) is a conference connection between the participants of said ongoing communication and said service node, the method further comprising the following steps
  h) said service node making a third call to one of the subscribers,
  i) the subscriber parking said conference call and answering said third call, said service node providing separate connections to the subscribers, i.e. the terminal respective the ether subscriber, thereby providing services separately.

19. Method of claim 17, characterized in that the service node is disconnected upon request by the terminal or the other subscriber.

20. Method of claim 17, characterized in that a payer of a service is registered by means of the fact that the service node has separate connections to the subscribers, whereby the original connection is registered to be paid by the caller and the calls from the service node to the requesting subscriber are paid by the service provider.

21. Method of claim 1, characterized in that the payer of the call can be registered by means of a certain call handling function.

22. Method of claim 21, characterized in that in accordance with the call handling functions, the incoming call is a direct or an indirect call to any subscription number associated with the terminal.

23. Method of claim 22, characterized in that indirect calls are delivered to the terminal by an intermediate system calling one of the numbers belonging to the terminal.

24. Method of claim 23, characterized in that the intermediate system is the service node.

25. Method of claim 22, characterized in that in accordance with one of the call handling functions, incoming calls to some of the subscriber numbers associated with the terminal are registered to be paid by the caller if a direct method of calling has been used.

26. Method of claim 22, characterized in that in accordance with one of the call handling functions, incoming calls to some of the subscriber numbers associated with the terminal are registered to be paid by the provider of the service associated with the subscriber number using an indirect method of calling through the intermediate system.

27. Method of claim 22, characterized in that in accordance with one of the call handling functions, outgoing calls are registered to be paid by the user of the terminal by using a direct method of calling out.

28. Method of claim 22, characterized in that in accordance with one of the call handling, functions, outgoing calls are registered to be paid by the service provider by use of a call back procedure from the service node.

29. Method in a telecommunications terminal, comprising an identification module with several subscriber numbers, of invoking desired services provided by different service providers,
- characterized by the following steps defining associations between at least one of the subscriber numbers in the identification module with at least one service provider providing one or more of different services,
- selecting a desired service among the services provided by a service provider associated with the terminal through service access numbers stored in the terminal, calling to a service access number of the service provider providing a desired service in accordance with a certain call handling function by means of which the desired service can be invoked and charged in different ways,
- invoking the service thereby provided by the service provider.

30. Method of claim 29, characterized in that associations between at least one of the subscriber numbers in the identification module with at least one service provider providing one or more of different services are defined by storing the associations in the terminal permanently so that s service provider is associated with the terminal through service access numbers.

31. Telecommunications terminal comprising an identification module with several subscriber numbers, characterized in that, it has functions allowing a user to define an association between at least one one of a plurality of subscriber numbers, defined by the module, with a specific service provider providing different services through service access numbers so that by calling to a service access number to a desired service in accordance with a certain call handling function, the desired service can be invoked and charged in different ways.

32. Telecommunications terminal of claim 31, characterized in that the telecommunications terminal is a mobile phone.

33. Telecommunications terminal of claim 32, characterized in that the identification module is a SIM card.

34. Telecommunication terminal of claim 31, characterized in that the call handling function is determined by a call category defined for each subscriber number of the terminal by means of which the call is charged in the desired way.

35. Telecommunication terminal of claim 31, characterized in that different call categories are associated with the different subscriber numbers used to call the terminal and to different service access numbers used to invoke different services.

36. Telecommunication terminal of claim 31, characterized in that at least one of a plurality of subscriber numbers belonging to said terminal is associated in form of data records with a service access number identifying a service node.

37. Telecommunication terminal of claim 31, characterized in that at least one subscriber number is associated with a prepaid card permitting calls to the number to be charged on the module.

38. Telecommunication terminal of claim 31, characterized in that the payer of the call can be registered by means of a certain call handling function.

39. Telecommunication terminal of claim 38, characterized in that in accordance with one of the call handling functions, incoming calls to some of the subscriber numbers associated with the terminal are registered to be paid by the caller if a direct method of calling has been used.

40. Telecommunication terminal of claim 38, characterized in that in accordance with one of the call handling functions, incoming calls to some of the subscriber numbers associated with the terminal are registered to be paid by the provider of the service associated with the subscriber number using an indirect method of calling through an intermediate system.

41. Telecommunication terminal of claim 38, characterized in that in accordance with one of the call handling functions, outgoing calls are registered to be paid by the user of the terminal by using a direct method of calling out.

42. Telecommunication terminal of claim 38, characterized in that in accordance with one of the call handling functions, outgoing calls to a certain service number are registered to be paid by the service provider if an indirect calling method through an intermediate system has been used.

43. Telecommunication terminal of claim 38, characterized in that in accordance with one of the call handling functions, incoming calls to a certain service number are rejected and the calling user is thereafter informed about a service phone number to make direct calls.

44. Use of the telecommunications terminal of claim 31, in different roles in which the user can select the different services and have them paid in different ways.

45. Use of claim 44, characterized in that, the terminal is used in roles as a private person, an employee and as a member in different organizations.

46. Use of claim 44, characterized in that the different roles are determined in connection with an incoming or outgoing call, whereby an associated service can be selected in advance to be connected later during the ongoing call.

47. Use of the mobile phone of claim 31, for selecting services from different service providers during an ongoing call.

48. Use of the mobile phone of claim 31, for charging the call on any of the user of the terminal, the calling subscriber or the service provider, in accordance with different call handling functions.

49. Use of the mobile phone of claim 31, for sending messages in a packet data system.

* * * * *